(12) United States Patent
Chavdar et al.

(10) Patent No.: US 9,468,970 B2
(45) Date of Patent: Oct. 18, 2016

(54) METHOD FOR MANUFACTURING A GEAR

(71) Applicant: Eaton Capital, Dublin (IE)

(72) Inventors: Bulent Chavdar, Saint Clair Shores, MI (US); Michael Killian, Troy, MI (US); Eric Nshimiye, Jackson, MI (US); Thomas Stoltz, Allen Park, MI (US)

(73) Assignee: EATON CAPITAL, Dublin (IE)

( * ) Notice: Subject to any disclaimer, the term of this patent is extended or adjusted under 35 U.S.C. 154(b) by 479 days.

(21) Appl. No.: 14/141,809

(22) Filed: Dec. 27, 2013

(65) Prior Publication Data

US 2014/0360018 A1 Dec. 11, 2014

Related U.S. Application Data

(60) Provisional application No. 61/883,464, filed on Sep. 27, 2013, provisional application No. 61/826,093, filed on May 22, 2013, provisional application No. 61/886,202, filed on Oct. 3, 2013.

(51) Int. Cl.
*B21K 1/30* (2006.01)
*B23P 15/14* (2006.01)
*B21J 5/02* (2006.01)
*B21J 1/02* (2006.01)

(52) U.S. Cl.
CPC .................. *B21K 1/30* (2013.01); *B23P 15/14* (2013.01); *B21J 1/02* (2013.01); *B21J 5/025* (2013.01); *Y10T 29/4948* (2015.01); *Y10T 29/49474* (2015.01)

(58) Field of Classification Search
CPC ........... B21K 1/30; B23P 15/14; B21J 1/02; B21J 5/025; Y10T 29/49474; Y10T 29/4948
See application file for complete search history.

(56) References Cited

U.S. PATENT DOCUMENTS

| 4,475,581 | A | * | 10/1984 | Langhammer | ........... B22D 7/02 164/100 |
|---|---|---|---|---|---|
| 4,479,293 | A | | 10/1984 | Miller et al. | |
| 4,602,952 | A | * | 7/1986 | Greene | ..................... B22F 7/06 419/38 |
| 5,106,012 | A | | 4/1992 | Hyzak et al. | |
| 5,271,287 | A | * | 12/1993 | Wadleigh | ............... B23K 20/12 474/152 |
| 8,220,153 | B2 | | 7/2012 | Kondo | |
| 2010/0322812 | A1 | | 12/2010 | Geiman | |
| 2012/0088116 | A1 | | 4/2012 | Carlson et al. | |

FOREIGN PATENT DOCUMENTS

| DE | 29821840 | 5/1999 | |
|---|---|---|---|
| GB | 2220595 | 1/1990 | |
| GB | WO 2013061071 A2 | * 5/2013 | ............... B21K 1/30 |

* cited by examiner

*Primary Examiner* — Sarang Afzali
(74) *Attorney, Agent, or Firm* — Dierker & Kavanaugh, P.C.

(57) ABSTRACT

A method for manufacturing a gear includes forming a bi-material billet from a steel cylinder having a cylindrical wall, a first end closed with a first steel cap, and an open second end distal to the first end. The method includes disposing a core material other than steel into the steel cylinder, welding a second steel cap onto the steel cylinder to form the bi-material billet, and heating the cylindrical wall. The method includes a first forging blow on the heated billet or on a disk-shaped rough forging forged from the heated billet with a first closed blocker die to produce a partial toothed preform, and a second forging blow on the preform with a second closed blocker die to produce a netshape gear. The first closed blocker die has a die cavity including gear tooth forms, and the partial toothed preform includes a plurality of spaced gear teeth.

16 Claims, 10 Drawing Sheets

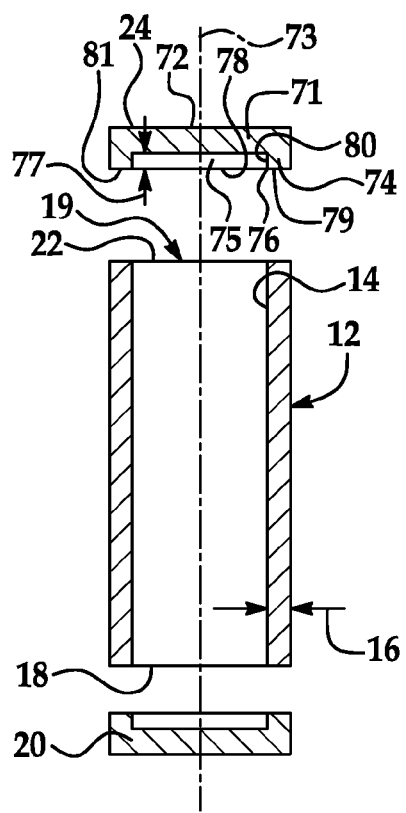 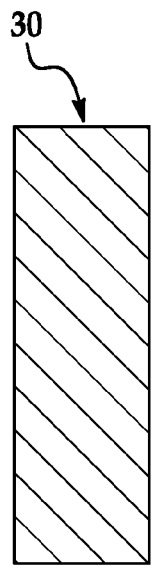 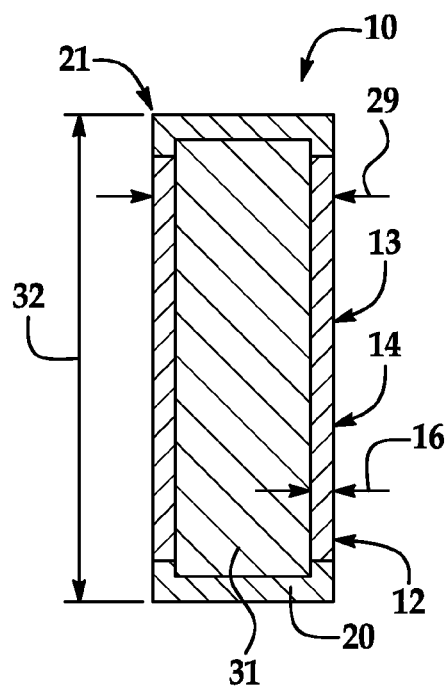
FIG. 1A  FIG. 1B  FIG. 1C
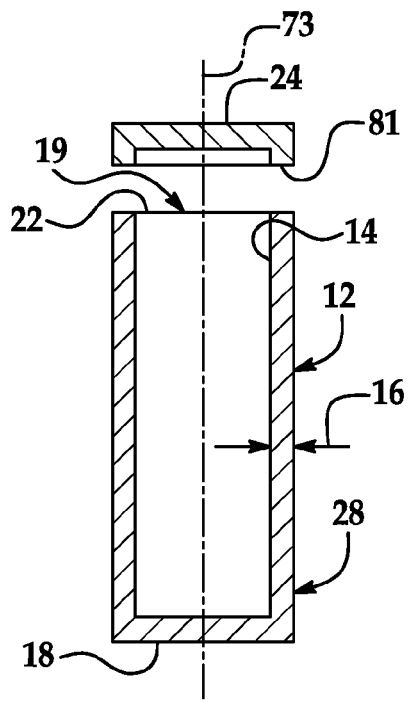 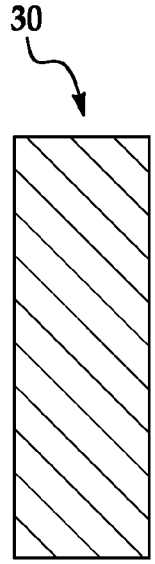 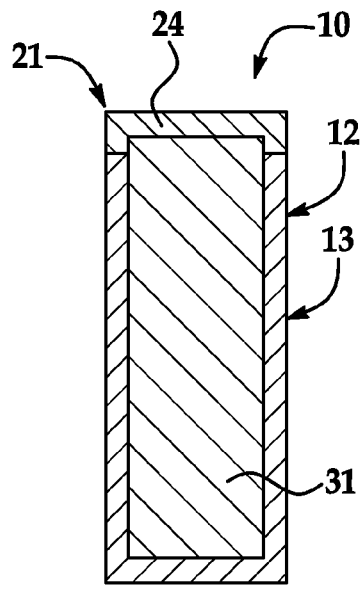
FIG. 2A  FIG. 2B  FIG. 2C

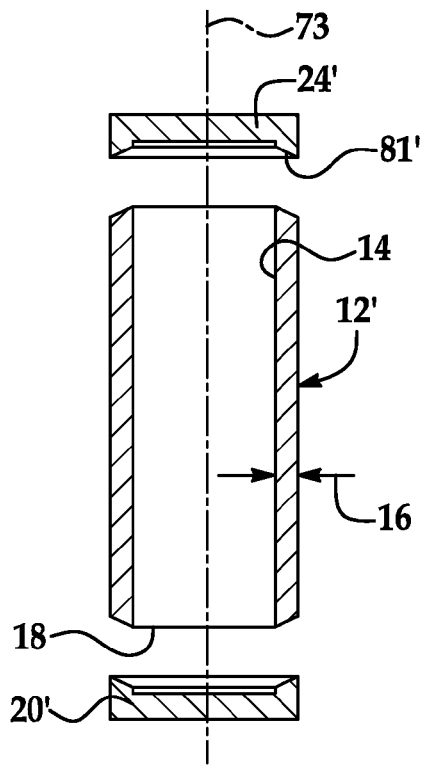 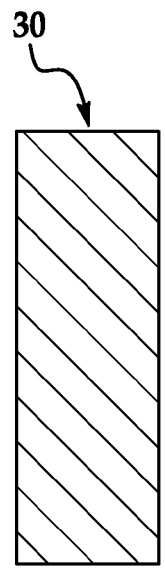 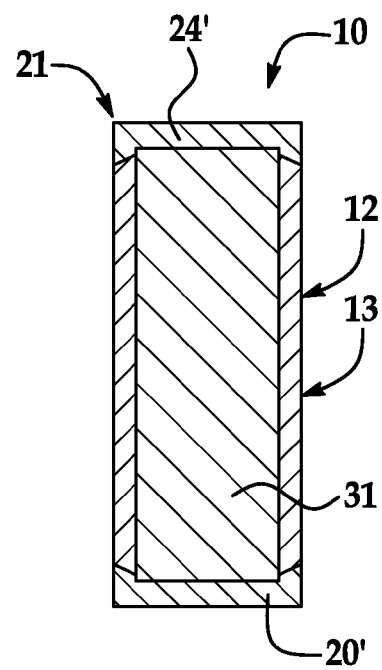
FIG. 3A    FIG. 3B    FIG. 3C
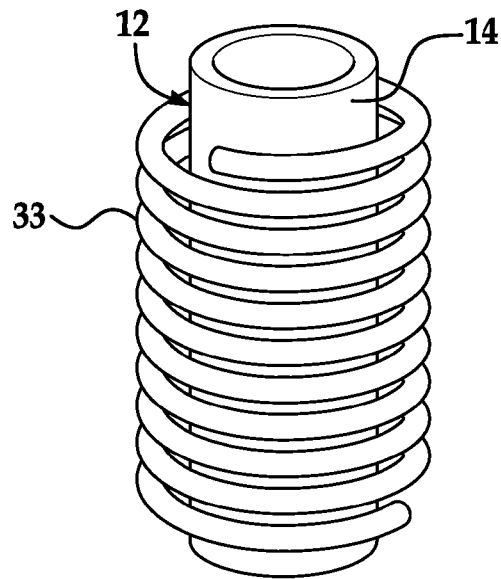
FIG. 4

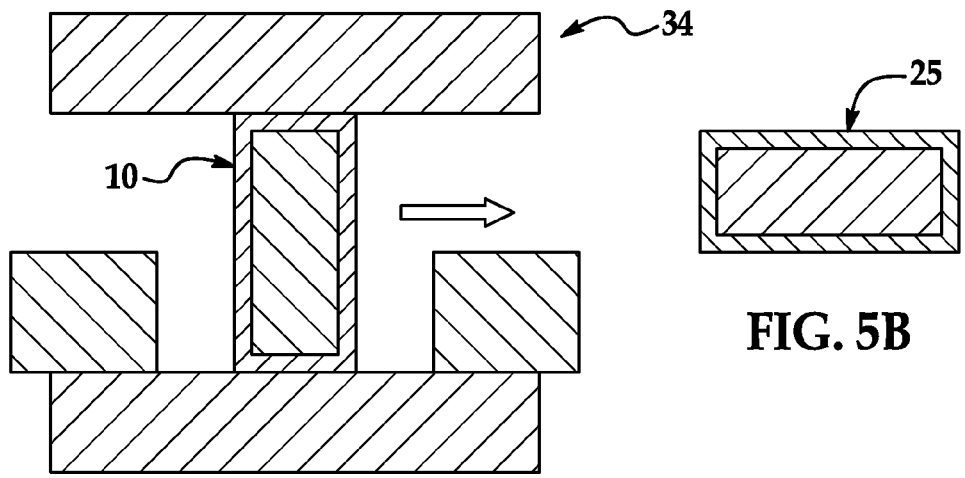
FIG. 5A  FIG. 5B
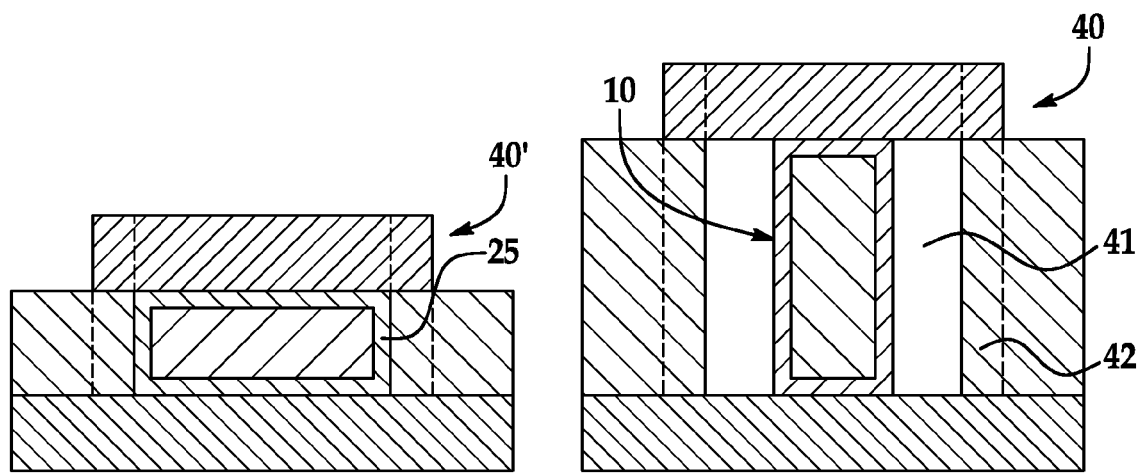
FIG. 6A  FIG. 6B
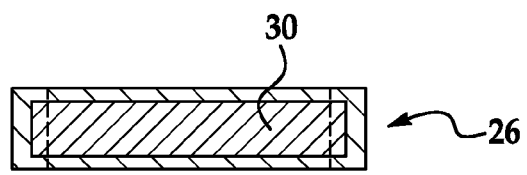
FIG. 6C

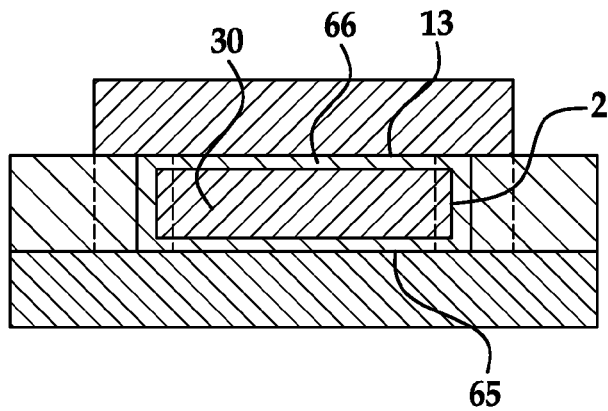
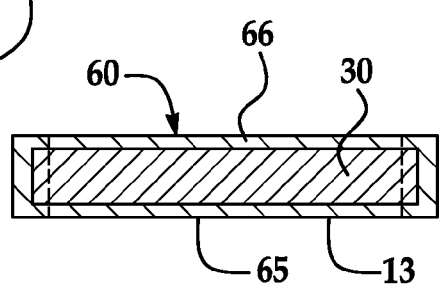
FIG. 7A    FIG. 7B
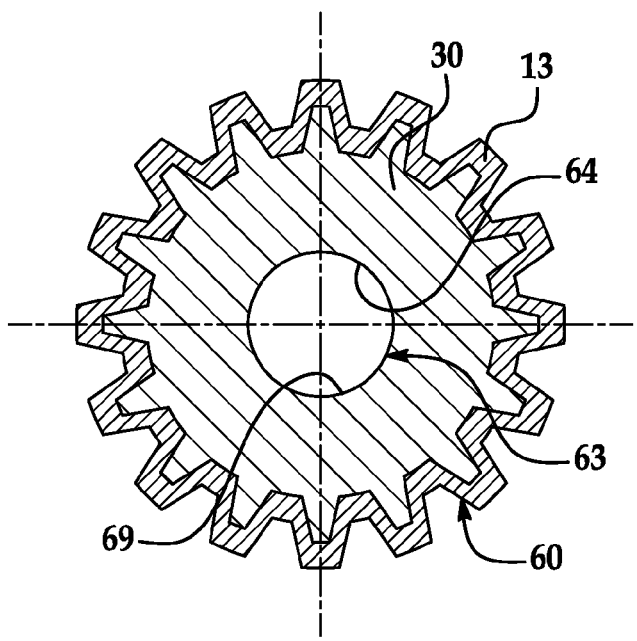
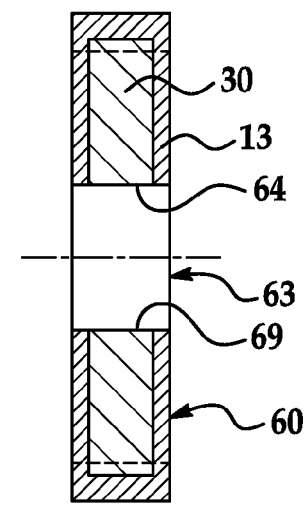
FIG. 7C    FIG. 7D

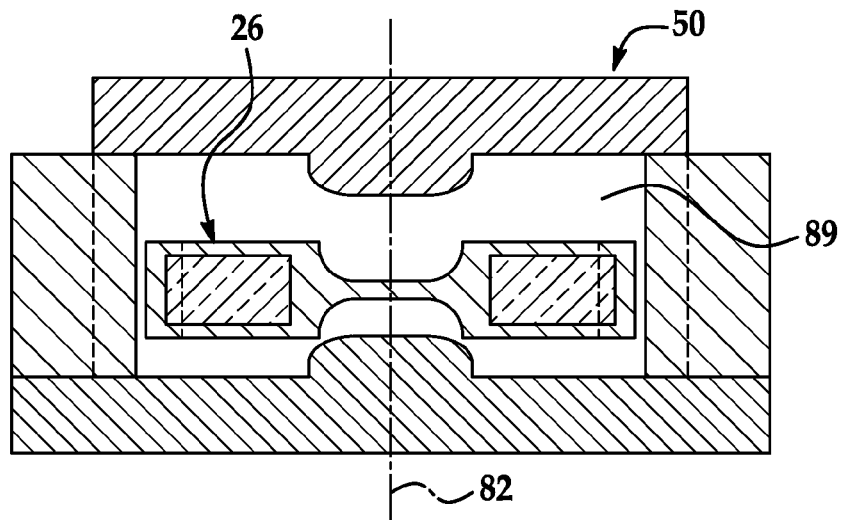
FIG. 11A
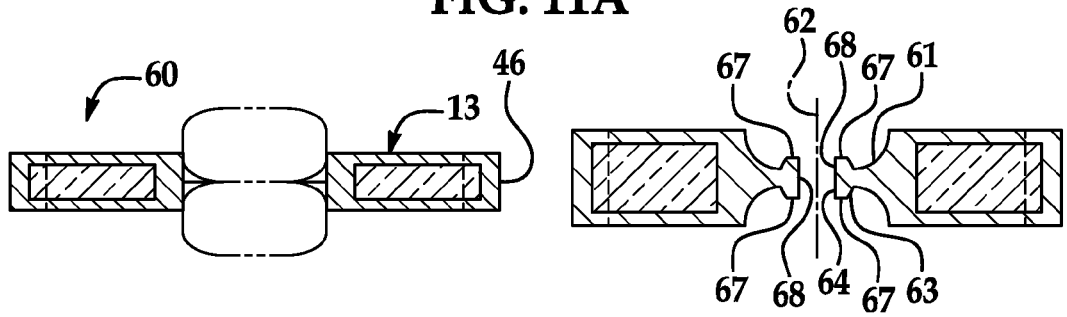
FIG. 11B　　FIG. 11C
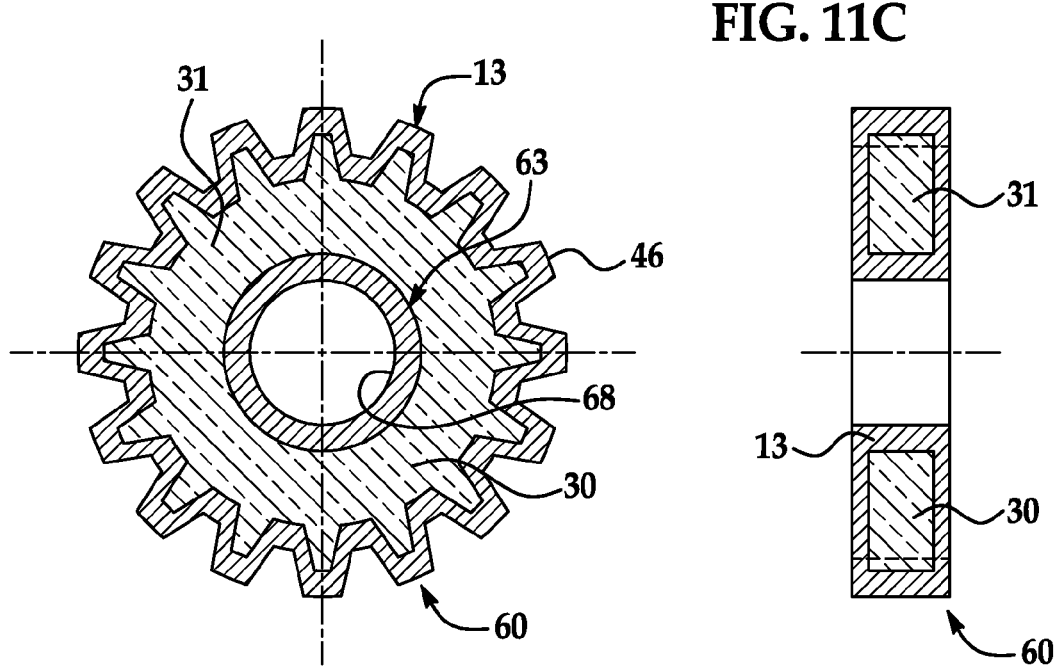
FIG. 12A　　FIG. 12B

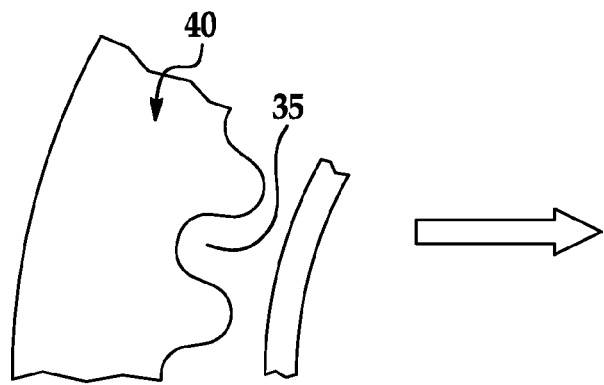
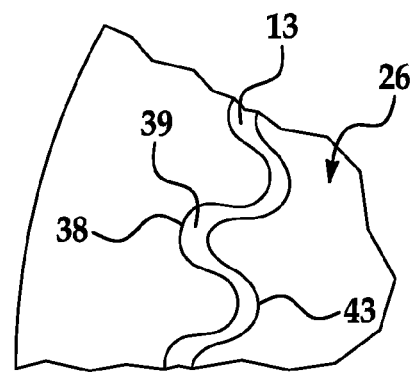
FIG. 13A  FIG. 13B
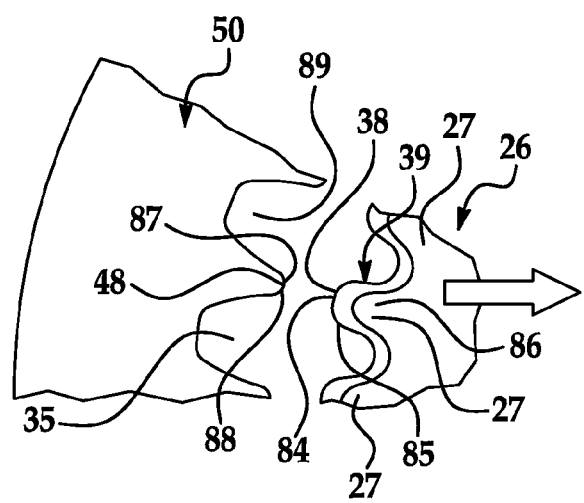
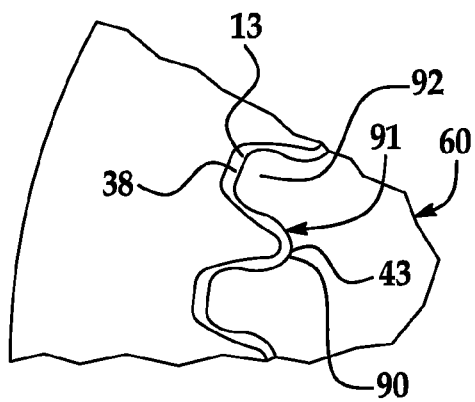
FIG. 13C  FIG. 13D
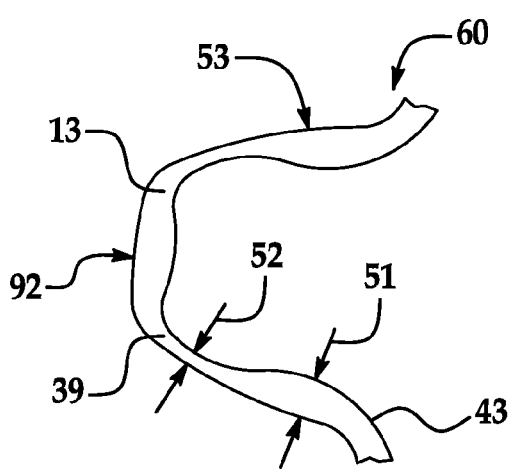
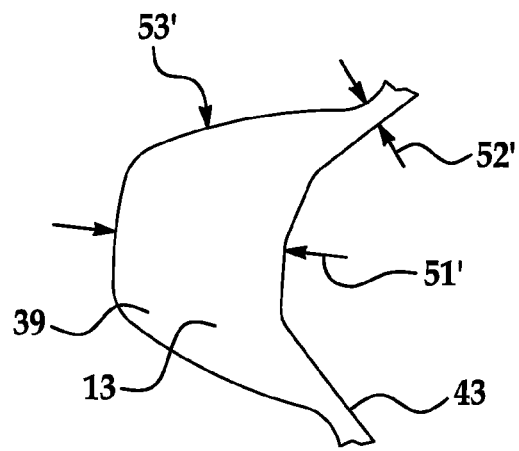
FIG. 14  FIG. 15

METHOD FOR MANUFACTURING A GEAR

CROSS-REFERENCE TO RELATED APPLICATIONS

This application claims the benefit of each of: U.S. Provisional Application Ser. No. 61/826,093, filed May 22, 2013; U.S. Provisional Application Ser. No. 61/883,464, filed Sep. 27, 2013; and U.S. Provisional Application Ser. No. 61/886,202, filed Oct. 3, 2013, the contents of which are incorporated herein by reference.

BACKGROUND

Current gear production methods generate up to 16,000 tons of scrap steel every year from the metal-removing machining processes. The generation of scrap also may increase the carbon foot print of gear manufacturing operations.

Reducing the weight of automotive vehicles improves their fuel efficiency. Transmission and driveline components may account for about 5 to 10 percent of the weight of a typical class 7/8 tractor. The gears may account for about 20% of the weight of a heavy duty manual transmission used in a class 7/8 tractor. Currently, almost all truck gears are made of steel.

SUMMARY

A method for manufacturing a gear includes forming a bi-material billet by providing a steel cylinder having a cylindrical wall with a cylindrical wall thickness, a first end closed with a first steel cap, and a second end distal to the first end wherein the second end is an open end. The method further includes disposing a core material other than steel through the open end into the steel cylinder, welding a second steel cap onto the second end of the steel cylinder to form the bi-material billet, and heating the cylindrical wall. The method still further includes performing a first forging blow on the heated billet or on a disk-shaped rough forging forged from the heated billet with a first closed blocker die driven by a press to produce a partial toothed preform, and performing a second forging blow on the partial toothed preform with a second closed blocker die driven by the press to produce a netshape gear. The first closed blocker die has a die cavity including gear tooth forms, and the partial toothed preform includes a plurality of spaced gear teeth.

BRIEF DESCRIPTION OF THE DRAWINGS

Features and advantages of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

FIG. 1A depicts a semi-schematic exploded cross-sectional view of an example of a steel tube and steel caps according to the present disclosure;

FIG. 1B depicts a semi-schematic cross-sectional view of an example of a core according to the present disclosure;

FIG. 1C depicts a semi-schematic cross-sectional view of an example of a bi-material billet according to the present disclosure;

FIG. 2A depicts a semi-schematic exploded cross-sectional view of another example of a steel tube and steel cap according to the present disclosure;

FIG. 2B depicts a semi-schematic cross-sectional view of another example of a core according to the present disclosure;

FIG. 2C depicts a semi-schematic cross-sectional view of another example of a bi-material billet according to the present disclosure;

FIG. 3A depicts a semi-schematic exploded cross-sectional view of yet another example of a steel tube and steel caps according to the present disclosure;

FIG. 3B depicts a semi-schematic cross-sectional view of yet another example of a core according to the present disclosure;

FIG. 3C depicts a semi-schematic cross-sectional view of yet another example of a bi-material billet according to the present disclosure;

FIG. 4 depicts a semi-schematic perspective view of an induction heater surrounding a billet according to the present disclosure;

FIG. 5A depicts a semi-schematic side view of a buster die and a bi-material billet prior to a buster blow;

FIG. 5B depicts a semi-schematic side cross-section view of a bi-material disk-shaped rough forging;

FIG. 6A depicts a semi-schematic side view of a 3-piece closed blocker die and a bi-material disk-shaped rough forging prior to a first forging blow;

FIG. 6B depicts a semi-schematic side cross-section view of a 3-piece closed blocker die and a bi-material billet prior to a first forging blow;

FIG. 6C depicts a semi-schematic side cross-section view of a partial toothed preform produced by the first forging blow of FIG. 6A or FIG. 6B;

FIG. 7A depicts a semi-schematic side view of a 3-piece closed blocker die and a bi-material partial toothed preform prior to a second forging blow;

FIG. 7B depicts a semi-schematic side cross-section view of a netshape gear produced by the second forging blow of FIG. 7A;

FIG. 7C depicts a semi-schematic side cross-section plan view of an example of a netshape bi-material gear produced by the second forging blow of FIG. 7A;

FIG. 7D depicts a semi-schematic side cross-section end view of the example of the netshape bi-material gear depicted in FIG. 7C;

FIG. 11A depicts a semi-schematic side view of a 3-piece closed blocker die and a bi-material partial toothed preform prior to a second forging blow;

FIG. 11B depicts a semi-schematic side cross-section view of a netshape gear produced by the second forging blow of FIG. 11A;

FIG. 11C depicts a semi-schematic side cross-section view of a netshape gear produced by the second forging blow of FIG. 11A with a steel annular flange formed into a steel hub;

FIG. 12A depicts a semi-schematic side cross-section plan view of an example of a netshape bi-material gear produced by the second forging blow of FIG. 11A;

FIG. 12B depicts a semi-schematic side cross-section end view of the example of the netshape bi-material gear depicted in FIG. 12A;

FIG. 13A depicts a semi-schematic cross-sectional view of the toothed portion of the forging die and a portion of a steel shell of the bi-material billet according to the present disclosure;

FIG. 13B depicts a semi-schematic cross-sectional view of the toothed portion of the forging die and a portion of a steel shell of the bi-material billet from FIG. 13A shown after the forging blow to create the partial toothed preform according to the present disclosure;

FIG. 13C depicts the portion of the steel shell of partial toothed preform from FIG. 13B rotationally indexed so a portion of the steel at a center of a top land of a tooth of the partial toothed preform is aligned with a center of a top land of the second blocker die cavity in an example of the present disclosure;

FIG. 13D depicts a semi-schematic cross-sectional view of the toothed portion of a forging die and the portion of a steel shell of the partial toothed preform from FIG. 13C shown after the forging blow to create a netshape gear according to the present disclosure;

FIG. 14 depicts an enlarged, cross section view of the steel shell of a tooth generated by the process depicted in FIGS. 13A-13D;

FIG. 15 depicts an enlarged, cross section view of the steel shell of a tooth generated by a non-indexed bi-material forging process.

DETAILED DESCRIPTION

Figure 8A:
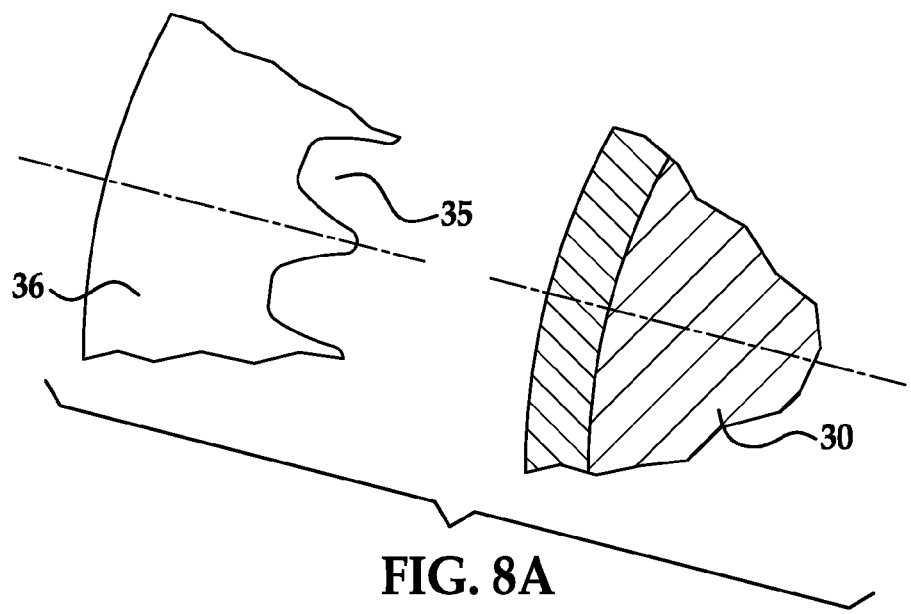
FIGS. 8A and 8B together depict a semi-schematic cross sectional view of gear teeth formed by forging a bi-material gear with a solid-state core according to the present disclosure.

The present disclosure relates generally to forged gears and the manufacturing thereof. Gears made according to the present disclosure may reduce the weight of the gears. For instance, in an example of the present disclosure, a bimetal composite gear (e.g., 50/50 aluminum/steel by volume) would reduce the weight of the gear by about 33%. A 33% weight reduction in the gears of a truck transmission would be about 0.5 percent of the weight of the truck, which would yield about 0.2% improvement in the fuel efficiency. If the steel to aluminum ratio is 25/75, then the weight savings can be shown to be 49% and fuel efficiency gain will be about 0.3%. It is expected that some vehicle owners will choose to increase the cargo carried in a lighter vehicle. As such, even if the gross vehicle weight is not reduced, productivity of the fleet will increase and provide similar efficiencies.

Some heavy duty manual transmissions have large spur gears and helical gears made of carburizing steel. Typically, gears are made in a two-step manufacturing process: hot forging followed by machining. In existing gear manufacturing methods, a tall cylindrical billet of steel is first hot-forged to a pancake shape. Next, a center hole and the teeth are formed by machining. As much as forty-five percent of the starting material may be removed as scrap in the machining operations. Most of the scrap material is generated during manufacturing operations to machine the gear teeth. It is estimated that about 20,000 tons of steel goes to scrap when six million heavy duty transmission gears are made in a year.

Some bevel gears for vehicle differentials are near net forged with teeth. However, it will be appreciated in light of the present disclosure that it can be cost prohibitive to forge the teeth of large size gears due to very high flow stresses encountered in existing gear manufacturing technology. A very large press may be required in existing gear manufacturing technology to forge the steel into multiple tooth cavities of the gear forge dies. Even if the cost of a very large press can be absorbed, the die stresses associated with the existing methods may be beyond engineering limits and lead to frequent die failures.

Examples of the method for manufacturing a gear disclosed herein include forming a bi-material billet 10. Referring now to FIGS. 1A-1C together, examples of the present disclosure may include providing a steel cylinder 12. In the example depicted in FIG. 1A, the steel cylinder 12 has a cylindrical wall 14 with a cylindrical wall thickness 16. As shown in FIG. 1C, a first end 18 of the steel cylinder 12 is closed with a first steel cap 20. A second end 22 of the steel cylinder distal to the first end 18 has an open state 19 for the introduction of a core material 30. The disclosed method includes closing the second end 22 with a second steel cap 24 thereby placing the second end of the steel cylinder in a closed state 21. Examples of the method disclosed herein further include disposing the core material 30 through the second end 22 in the open state 19 in the steel cylinder 12. After the core material 30 is disposed in the steel cylinder 12, the second steel cap 24 may be welded onto the second end 22 of the steel cylinder 12 to close the second end 22 and form the bi-material billet 10.

The first end 18 of the steel cylinder 12 may be closed by a separate first steel cap 20 that is welded to the steel cylinder 12 as depicted in FIGS. 1A and 1C. In another example, the steel cylinder 12 is closed by an integral first steel cap 20 that may be formed, for example with the steel cylinder 12 as a deep draw cup as shown in FIG. 2A. In examples of the present disclosure, the second steel cap 24 may be welded onto the second end 22 of the steel cylinder 12 by electron beam welding or by friction welding.

In examples in which friction welding is used to weld the steel caps 20, 24 onto the steel cylinder 12, the steel caps 20, 24 and the steel cylinder 12 may each be grasped by a 3 or 4-jaw chuck (not shown). The 3 or 4-jaw chuck may be hollow with jaws that are long enough to enable good engagement over a long portion of the steel caps 20, 24 and the cylinder 12.

In an example of the present disclosure, the second steel cap 24 may include a steel disk 71 having a substantially flat base surface 72 and center axis 73 orthogonal to the base surface 72. An annular wall 74 projects from the steel disk 71 opposite to the base surface 72. An open cavity 75 is defined by the annular wall 74 and the disk 71. The open cavity 75 has a mouth 76 opposite the disk 71 defined by the annular wall 74. The open cavity 75 has a depth 77 measured from a plane 78 defined by an edge 79 of a shortest side 80 of the annular wall 74 to the steel disk 71. In an example, the depth 77 ranges from about 0.005 inch to about 0.015 inch. In another example, the depth 77 ranges from about 0.005 inch to about 0.025 inch. An end surface 81 is defined on the annular wall 74 distal to the steel disk 71. As shown in FIGS. 1A and 2A, the end surface 81 is substantially flat and perpendicular to the center axis 73. In the example depicted in FIG. 3A, the end surface 81' is an annular bevel. In examples of the present disclosure, the first cap 20, 20' may be substantially identical to the second steel cap 24, 24'.

FIGS. 2A-2C are similar to FIGS. 1A-1C except the steel cylinder 12 is closed by an integral first steel cap 20 that may be formed, for example with the steel cylinder 12 as a deep draw cup as shown in FIG. 2A. FIGS. 3A-3C are similar to FIGS. 1A-1C except the interface between the steel caps 20, 24 and the steel cylinders 12 is flat in FIGS. 1A and 1C, and beveled in FIGS. 3A and 3C. The first steel cap and the second steel cap are at reference 20' and 24' respectively in FIG. 3A. The core material 30 is the same in FIGS. 1-3 B, and 1-3 C.

The bi-material billets 10 made according to the present disclosure have a steel shell 13 and a light weight core 31. As shown in FIGS. 1C, 2C, and 3C, the steel shell 13 may include the steel cylinder 12, the first steel cap 20, 20', and the second steel cap 24, 24'. The lightweight core 31 may be fully enclosed inside the steel shell 13. A method of preparing the bi-material billets 10 with the steel shell 13 and lightweight core 31 is disclosed herein. The materials formed into the lightweight core 31 may be a light weight metal or a non-metal. According to the method disclosed herein, the lightweight core 31 may be made from a solid, a liquid, a powder or combinations thereof.

In examples of the present disclosure having a powder core, the melting temperature of the powder may be higher than the forging temperature. Without being bound to any theory, it is believed that a powdered material core may allow thermal expansion of the powder into the pore space of the powder without inducing thermal stresses on the steel shell 13. A potential for buckling of the steel shell 13 during forging may be reduced by compacting the powder core in a solid form before inserting the solid core into the steel cylinder 12. The potential for buckling may also be reduced by using a mixture of sand, cement, plasticizer, fiber and moisture that may cure into a mono-block solid shape during and after forging at high temperatures.

In examples of the present disclosure, the core material 30 may be selected from the group consisting of: clay, workable wet concrete, sand, glass powder, ceramic powder, mineral powder, metal particles, and combinations thereof. The metal particles are non-sintering during the forging steps, and have a lower density than steel. In such examples, the stress that produces flow of the light weight core material 30 is negligible when compared to the stress that would be required to forge a steel core. The core material 30 may be flowable during the first forging blow and the second forging blow. As used herein, a flowable core material means a core material 30 having a viscosity (either powder or viscous material) less than about 1.0 hectopoise at the core material forging temperature. In an example, the core material forging temperature may be relatively low compared to the steel shell 13. In other examples, the core material forging temperature may be from about 900° C. to about 1200° C. From about 900° C. to about 1200° C. is a "working temperature" range for glass in examples of the present disclosure. In the "working temperature" range, glass has the consistency of a taffy or molasses and the microstructure is amorphous. The range from about 900° C. to about 1200° C. is also a typical hot forge temperature range for steel. The steel shell 13 may deform at very high deformation rates without fracturing when forged between 900° C. and 1200° C. Martensitic transformations in steel are enabled upon rapid cooling from the forging temperature of about 900° C. to 1200° C. by quenching in oil or water.

In examples of the present disclosure, a coefficient of thermal expansion (CTE) of the core material 30 may be substantially the same as a CTE of the steel shell 13. As used herein, CTEs are substantially the same if a ratio of the CTEs of the two materials ranges from about 0.8 to about 1.2.

In an example, the core material 30 is composed of a single piece of aluminum or an aluminum alloy. Although the CTE of aluminum is about 3 times the CTE of steel, the method disclosed herein reduces the effect of the difference in CTE by carefully controlling the heating of the bi-material billet 10. Without being bound to any theory, it is believed that the steel shell 13 experiences a greater temperature rise than the aluminum. As such, the thermal expansion of the steel shell 13 is close to the thermal expansion of the aluminum core material 30. The core material 30 may be in a solid phase during the step of disposing the core material 30 into the steel cylinder 12. The core material 30 is maintained in the solid phase during the welding of the second steel cap 24 onto the second end 22 of the steel cylinder 12. In other words, the welding energy welds the second steel cap 24 to the steel cylinder 12 without melting the aluminum core. In the example, the core material 30 also remains in the solid phase during the heating step in which the cylindrical wall 14 is heated with a high frequency induction heater. The aluminum core material still remains solid during the first forging blow and the second forging blow. To allow the steel cylinder 12 to be heated to the forging temperature without melting the aluminum core, heat is applied to the bi-material billet 10 at a high power. High frequency induction heating may allow the steel cylinder 12 to be rapidly and evenly heated. The heating may be performed via a high frequency induction heater 33 (see FIG. 4) operating on the cylindrical wall 14 at an operating frequency from 9000 Hertz to 11000 Hertz and wherein the high frequency induction heater 33 applies from 5000 Kilowatts to 7000 Kilowatts per square meter of an external surface of the steel cylinder 12. Examples of the method may include heating the cylindrical wall 14 until a minimum temperature of a coolest portion of the cylindrical wall 14 is at least about 1900 degrees F. (Fahrenheit) (1038° C.) and a maximum temperature of a hottest portion of the cylindrical wall is less than about 2300 degrees F. (1260° C.).

The following example is used to illustrate a calculation of the power of an induction heater. The bi-material billet 10 in the example may have an outer diameter 29 (see FIG. 1C) of about 3.3 inches (0.084 m), and a length 32 of about 5 inches (0.127 m) with a cylindrical wall thickness 16 of about 0.4 inches (0.010 m). The surface area of the cylinder in the example is about 51.83 square inches (0.033 m²). A 200 kW, 10 kHz induction heater would apply about 5980 kW per square meter of induction heat energy to the cylindrical wall 14.

A first forging blow may be performed on the heated bi-material billet 10 with a first closed blocker die 40 (see FIG. 6B) driven by a press (not shown). The first closed blocker die 40 may have a die cavity 41 including gear tooth forms 42 to produce a partial toothed preform 26 (see FIG. 6C) including a plurality of spaced gear teeth 27 (see FIG. 8B). In an example, the heated bi-material billet 10 may be forged in a rough forging blow into a disk-shaped rough forging 25 (see FIG. 5B) in a buster die 34 (see FIG. 5A) prior to the first forging blow in the first closed blocker die 40' (see FIG. 6A). As depicted in FIGS. 7A and 7B, a second forging blow is performed on the partial toothed preform 26 with a second closed blocker die 50 driven by the press to produce a netshape gear 60 (see FIGS. 7C and 7D).

Figure 8B:
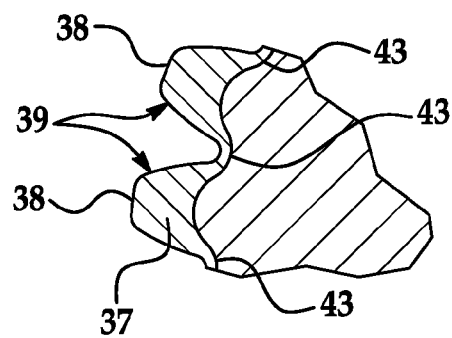

As depicted in FIGS. 8A and 8B, three-dimensional (3D) forging simulations have shown that when the core material 30 is in a solid state, the core material 30 may, in some instances, penetrate only a small amount into the gear tooth cavities 35 of the forging die 36. The result of solid state core bi-material forging in such instances may result in a steel wall 37 having a non-uniform thickness such that the steel wall 37 is thickest at the apex 38 of the gear tooth 39 and thinnest at the root 43 of the gear tooth 39. During use, the highest bending stresses in the gear tooth 39 may occur at the root 43 of the gear tooth 39. A weight optimized bi-material gear (not shown) may have relatively more steel at the root 43 of the gear tooth 39 compared to the apex 38 to offset the bending stresses. As such the bi-material billets 10 with the core material 30 in the solid state during forging as disclosed herein may have the cylindrical wall thickness 16 of the bi-material billet 10 sized to ultimately forge gear teeth 39 with durable roots 43.

The method of the present disclosure may include forging gears with a bi-material billet 10 having a liquid or viscous glass core inside of a steel shell 13. The forging method that includes the liquid or viscous glass core inside of the steel shell 13 as disclosed herein is to be called "hot-hydroforging." It is believed that hot-hydroforging as disclosed herein is heretofore unknown.

Figure 9:
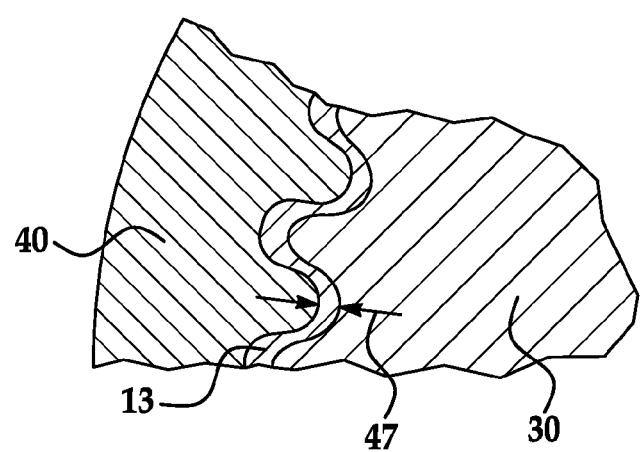
FIG. 9 depicts a semi-schematic cross sectional view of teeth formed by forging a bi-material billet with a liquid core according to the present disclosure.

Examples of the method disclosed herein that include hot-hydroforging may improve a uniformity of the thickness of the steel wall 37 in the gear tooth 39. In hot-hydroforging the core material 30 is in a liquid state or a viscous glass state while the steel shell 13 is solid. When the core material 30 is in liquid state it exerts substantially zero resistance to flow under pressure created during forging. As used herein, substantially zero resistance to flow under pressure means the resistance of a liquid to shear is negligibly small as compared to that of a solid. In an example, the core material 30 is aluminum or an aluminum alloy. In the example, the aluminum/aluminum alloy is in a molten state during forging. The molten aluminum exerts a uniform hydrostatic pressure to the steel shell 13 and forces it into the gear tooth cavities 35 of the forging die 36 more uniformly by eliminating the non-uniform stress field (or pressure build up) underneath the steel shell 13 due to the resistance of a solid core material to flow. FIG. 9 shows that uniformity of the thickness of the steel shell 13 is improved significantly with the hot-hydroforging as compared to the example from solid core bi-material gear forging depicted in FIG. 8B.

While examples with the core material 30 composed of 100 percent liquid aluminum or viscous glass are disclosed herein, it is to be understood that using up to 15 percent by volume of a light weight, incompressible filler material dispersed evenly throughout the liquid or viscous glass core material is also disclosed herein. In examples, the incompressible filler material may be in powder form, solid wire mesh form, or solid reinforcement bar form.

In examples, at least 85 percent of the volume of the core material 30 is in a liquid phase or a viscous glass phase during the steps of performing the first forging blow and performing the second forging blow. Liquid aluminum may be disposed through the open end 23 into the steel cylinder 12 before the second steel cap 24 is welded onto the cylinder 12 to close the billet 10. In another example, a molten glass core may be introduced into the open end 23 of the steel cylinder 12 before the second steel cap 24 is welded onto the steel cylinder 12 to close the billet 10. In yet another example, alkali silicate glass (CTE of about $9.6 \times 10^{-6}$ 1K) may be placed in solid form through the open end 23 into the steel cylinder 12 before the second steel cap 24 is welded onto the steel cylinder 12 to close the billet 10. In still another example, borofloat glass (CTE of $3.3 \times 10^{-6}$ 1K) may be transferred in powder form through the open end 23 into the steel cylinder 12 before the second steel cap 24 is welded onto the steel cylinder 12 to close the billet 10. It is to be understood that when the core material 30 is in a powder or liquid form before welding the cap 24 onto the steel cylinder 12, the billet 10 may be kept in an upright position for the welding to avoid spilling the powder or liquid core material out of the open end 23 of the steel cylinder 12 under the influence of gravity.

The billet 10 may be heated such that the coldest portion of the core material 30 has a temperature that is less than or equal to the temperature of the inside wall of the steel shell 13 and the core material 30 is in a liquid phase or the viscous glass phase having a viscosity of less than about 1.0 hectopoise. In examples that include hot-hydroforging the heating of the billet 10 may be performed in a furnace. In an example, the steel cylinder 12 may be filled with a molten glass ranging in temperature from about 1200° C. to about 1300° C. Heat from the molten glass is transferred to the steel shell 13, thereby requiring no additional heat from a furnace or induction heater to bring the billet to the forging temperature. The second end cap 24 may be welded onto the hot steel cylinder 12 filled with hot core material 30. Next, the hot billet 10 is forged immediately before the billet cools below the forging temperature.

It is to be understood that, while welding a vertically oriented steel container with molten glass may be feasible technically, the proximity of the welding operation to the forging press may subject the weld to contamination from the normally dirty forging press. Contaminants from the press may be deleterious to weld quality if the contaminates get trapped in the weld.

Figure 10A:
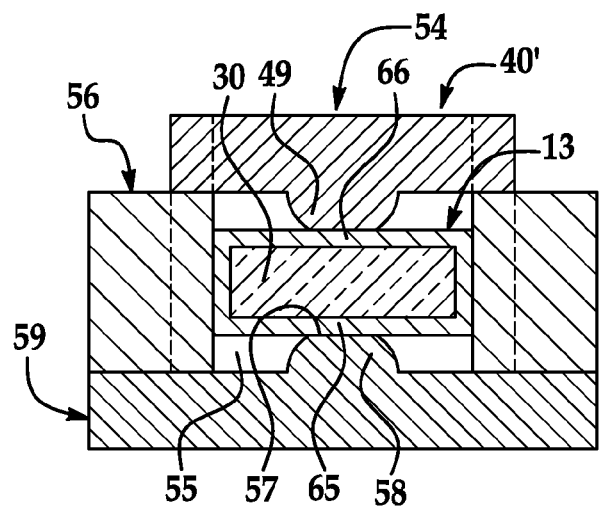
FIG. 10A depicts a semi-schematic side view of a 3-piece closed blocker die and a bi-material disk-shaped rough forging prior to a first forging blow.
Figure 10B:
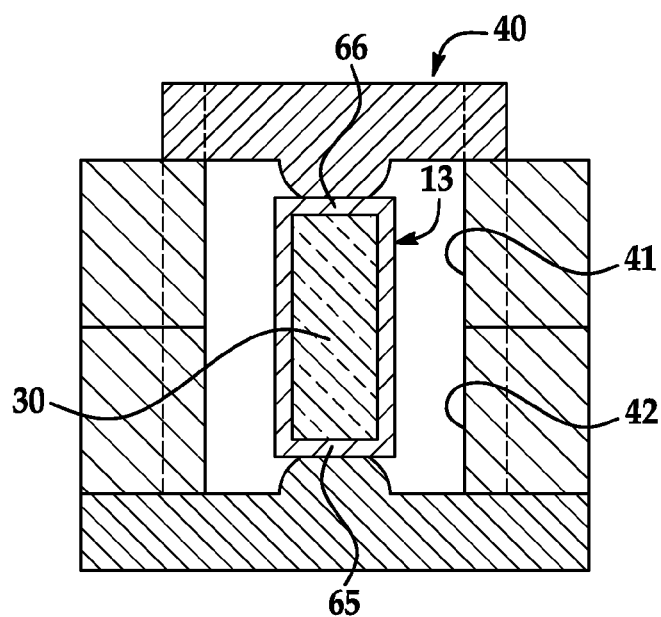
FIG. 10B depicts a semi-schematic side cross-section view of a 3-piece closed blocker die and a bi-material billet prior to a first forging blow.
Figure 10C:
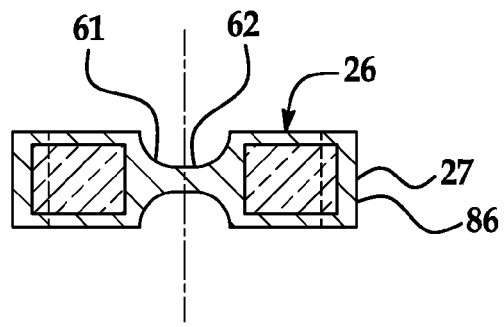
FIG. 10C depicts a semi-schematic side cross-section view of a partial toothed preform produced by the first forging blow of FIG. 10A or 10B.

FIGS. 10A-10C depict similar forging operations to FIGS. 6A-6C except the core material 30 is in a liquid or viscous glass state that allows additional features and results described below. In the examples in which the core material 30 is in the liquid phase or viscous glass phase, the core material 30 may be squeezed out of the center 62 of the partial toothed preform 26 or the netshape gear 60 during forging. As depicted in FIGS. 10A-10C, during the first forging blow, the first blocker die 40, 40' may be operated to squeeze the core material 30 from between a first central portion 65 of the steel shell 13 and a second central portion 66 of the steel shell 13 opposite the first central portion 65 to collapse the first central portion 65 and the second central portion 66 into mutual contact thereby producing a steel web 61 at a center of the partial toothed preform 26 or the netshape gear 60.

The steel web 61 and the gear teeth 27 can be forged in a three-piece closed die set 40' as shown in FIG. 10A. The bi-material pancake 25 (disk-shaped rough forging 25) fits into the center cavity 55 of the middle die 56 and is supported on the top 57 of the protruding boss 58 of bottom die 59 of the three-piece closed die set 40'. The top die 54 and the bottom die 59 each have a protruding center boss 58, 49 to forge the steel web 61. Further, the top die 54 and the middle die 56 each have complementary, mating teeth to close the dies 54, 56 and to form the teeth 86 of the partial toothed preform 26. In examples, the forging temperature may be above the melting point of the core material 30 to make the core material 30 flow easily. A one-hundred percent steel web 61 may be forged by squeezing out the molten core material 30 from the center of bi-material billet 10 towards the teeth 86 by bringing the first central portion 65 and the second central portion 66 into complete contact at the center when the die set 40' is closed. The web 61 may be used to eject the partial toothed preform 26 from the die 40'.

As shown in FIGS. 7A-7D, if the core material 30 is not in a liquid state during forging, it cannot be squeezed out from between the first central portion 65 and the second central portion 66 due to high coefficients of friction between the steel shell 13 and the solid core material 30 and also due to relatively high flow stress in the solid core material 30 compared to the flow stress if the core material 30 were in a liquid state. In examples in which the core material 30 is not a liquid, if the central aperture 64 is machined out of the netshape gear 60, the core material 30 will be exposed at an inner surface 68 of hub 63 (see FIG. 7D). It may be more difficult to have a strong and durable connection between the bi-material gear and a steel shaft (not shown) if the core material dominates the interface.

In the example depicted in FIG. 10C, the partial toothed preform 26 may be forged with only a thin, steel web 61 in the center 62. As shown in FIG. 11C, having a steel web 61 without the light weight core material 30 sandwiched inside allows a steel hub 63 to define a central aperture 64 with an inner steel surface 68 rather than a central aperture 64 through the steel shell 13 and light weight core material 30 as shown in FIG. 7C and FIG. 7D. As shown in FIGS. 12A and 12B, the core material 30 is completely enclosed within the steel shell 13 in the finished bi-material gear made in an example of the present disclosure that includes hot-hydroforging.

FIGS. 12A and 12B schematically depict a composite gear made of a steel shell 13 and a lightweight core 31. In the example depicted in FIG. 12A, and FIG. 12B, the lightweight core 31 is fully enclosed in the steel and formed into the teeth area thereby interlocking with the steel mechanically. The mechanical interlocking can reduce a dependence on strong metallurgical bonding between the steel shell 13 and lightweight core 31. Steel surfaces can engage with the other components of the transmission system such as the mating gears at the teeth 46 and a shaft (not shown) at the inner steel surface 68. The steel shell 13 of the bi-material gear can carry the bulk of torque from one component to the other and also can provide long fatigue life to the gear. Furthermore, the steel surfaces of the steel shell 13 can be induction hardened to withstand very high Hertzian contact stresses between the mating components. The lightweight core 31 can serve as a placeholder inside the steel shell 13 for support, spread, and distribution of stresses, which can be shown to thereby reduce risk of any plastic deformation to the steel shell 13 under loading.

Examples that include hot-hydroforging may forge the central aperture 64 of the netshape gear 60 by bringing the steel shell 13 at the first end 18 and the second end 22 of the bi-material billet 10 into contact or near contact by squeezing the liquid core material 30 out towards the teeth 46 of the netshape gear 60. When portions of the steel shell 13 at the first end 18 and the second end 22 of the bi-material billet 10 are brought into contact at the center 62 of the netshape gear 60 during forging they form a thin, steel web 61 that may have an annular flange 67 formed into a hub 63 as depicted in FIG. 11C. The thin, steel web 61 may be machined at the center 62 to open the central aperture 64. Splines (not shown) may be machined on the inner steel surface 68 of the hub 63 as part of the final finishing operations. The steel splines on the hub 61 and on the steel shaft (not shown) will enable a strong and durable assembly between the gear and the shaft to carry a torque similar to a 100% steel gear produced by existing methods.

In examples with a large difference between the thermal expansion of the steel shell 13 and the thermal expansion of the core material 30, a cold coining and blanking operation may be applied on the bi-material forged gear. For example, the steel shell 13 and an aluminum core may be forged at a relatively uniform temperature above the melting point of aluminum and below the melting point of steel. Due to its higher coefficient of thermal expansion than that of steel, the aluminum core will tend to shrink more than the steel shell upon cooling and may tend to separate from the steel shell 13. A cold coining operation will bring the aluminum core and the shell into firm contact. The coining die set can be designed such that the center web can also be blanked out at the same time with coining. A bi-material forged and coined gear may also have final machining and surface hardening operations performed thereon.

Examples of the present disclosure include multi-blow indexed forging to reduce thinning of the steel shell 13 at the roots 43 of the teeth 46 of the bi-material gear. Performing the second forging blow with a tooth alignment described below is termed "indexed" hot-hydroforging herein. It is believed that indexed hot-hydroforging is heretofore unknown. In examples of the present disclosure, a netshape gear 60 with teeth 46 is forged with two or more blows. At the first blow only a fraction of the final tooth height is forged in the gear tooth cavities 35 of the first blocker die 40. FIG. 13B shows that a portion of the steel shell 13 is thick at the apex 38 of the tooth 39 of the partial toothed preform 26 and another portion of the steel shell 13 is thin at the root 43 of the tooth 39 at the end of first blow. When the partial toothed preform 26 is placed in the second blocker die 50, it is indexed such that the apex 38 of the tooth 39 of the partial toothed preform 26 aligns with the root 48 of tooth cavity 35 in the second die 50 as shown in FIG. 13C. The partial toothed preform 26 may, for example, be placed into the second die by a robot (not shown). Prior to the second blow the thick portion at the apex 38 of the tooth 39 of the preform faces toward the protrusions of second die that will form the root 43 of final teeth.

FIG. 13D shows that the steel shell 13 gets thinned at the root 43 and thickened at the apex 38 by the second blow. By optimizing the depth of tooth cavities 35 in the first and the second dies 40, 50, the uniformity of the thickness of the steel shell 13 on the tooth 39 may be improved. Further, a portion of the steel shell 13 at the root 43 of the tooth 39 may be thicker than at the apex 38 of the tooth 39 in the final gear. A thicker steel shell 13 at the root 43 of tooth 39 will increase the load carrying capability and bending fatigue life of the bi-material forged gear. Furthermore, the multi-blow indexed forging method disclosed herein enables using thinner steel cylinders 12 in the bi-material billet 10 and achieving higher weight reductions than it is possible with single blow and un-indexed forging operations. Although multi-blow indexed forging has been described above for hot-hydroforging, it is to be understood that multi-blow indexed forging is also applicable to solid state forging of bi-material gears as disclosed herein.

Examples of the method disclosed herein may include transferring the partial toothed preform 26 to a second blocker die cavity 89 in a die 50. A center of the partial toothed preform 26 is aligned with a center 82 of the second blocker die cavity 89 (see FIG. 11A). A portion of the steel shell 13 at a center 84 of a top land 85 of a tooth 86 of the partial toothed preform 26 is rotationally aligned with a center 87 of a top land 88 of the second blocker die cavity 89 (see FIG. 13C). After the partial toothed preform 26 is aligned as disclosed above, the second forging blow is performed on the partial toothed preform 26 in the second blocker die cavity 89. Indexed hot-hydroforging as disclosed herein causes the portion of the steel shell 13 at the center 84 of the top land 85 of the tooth 86 of the partial toothed preform 26 to be the center 90 of the bottom land 91 of a gear tooth 92 of the netshape gear 60. The second forging blow may also form a central aperture 64 completely through the steel web 61 of the netshape gear 60 (see FIG. 11B).

Examples of the present disclosure include indexed hot-hydroforging of a bi-material gear with a steel outer shell 13 such that a minimum thickness of steel on the gear teeth 92 is at least 50 percent of a maximum thickness of steel on the gear teeth 92. The minimum thickness of steel on the gear teeth 92 may be at least 2 millimeters.

FIG. 14 shows simulation results of steel wall thickness uniformity comparison with two-blow indexed hot-hydroforging for comparison with FIG. 15. FIG. 15 depicts the results of a single-blow solid state forging of the same bi-material billet 10. It is believed that the disclosed method including the two-blow indexed hot-hydroforging reduces non-uniformity in the thickness of the steel shell 13 at the root 43 of the teeth 39 caused by friction between the steel shell 13 of the billet 10 and the die 40, 50 surface.

Referring to FIGS. 14 and 15, a non-uniformity index is defined herein as the ratio of thickest steel wall 51, 51' to the thinnest steel wall 52, 52' in the respective tooth profile 53, 53' to quantify the steel wall thickness uniformity. As depicted in FIGS. 14 and 15, multi-blow indexed hot-hydroforging improved the steel wall thickness uniformity over 5 times as compared to the single blow forging. With regard to the manufacturing costs of gears, the bi-material forged gears of the present disclosure may have the following cost advantages over solid steel gears: 1. The bi-material billet can be forged at lower temperatures than a solid steel billet. Hence, less energy will be spent to heat up the bi-material billet. 2. The final finish operation on a net shape gear with teeth requires much less effort than machining the whole teeth on a steel pancake. 3. The surface of a bi-material forged gear can be hardened by induction hardening instead of carburizing. Induction hardening consumes less energy than carburizing does.

An example of an induction hardening process according to the present disclosure includes induction heating and spray quenching. The induction heating of the steel shell 13 may be performed with single or dual frequency power supplies. A shallow case, for example 0.045 inch (1.14 mm), of the steel shell 13 is elevated to a temperature of about 1500 degrees F. (815 degrees C.). The remainder of the steel shell 13 does not need to achieve the 815° C. temperature. The heating of the shallow case may be complete in about 3 seconds. As soon as the case reaches the 815° C. temperature target, the gear is spray quenched with a polymer or oil solution. Cracking is prevented by avoiding overheating the case, and by induction tempering the gear after spray quenching.

Figure 16A:
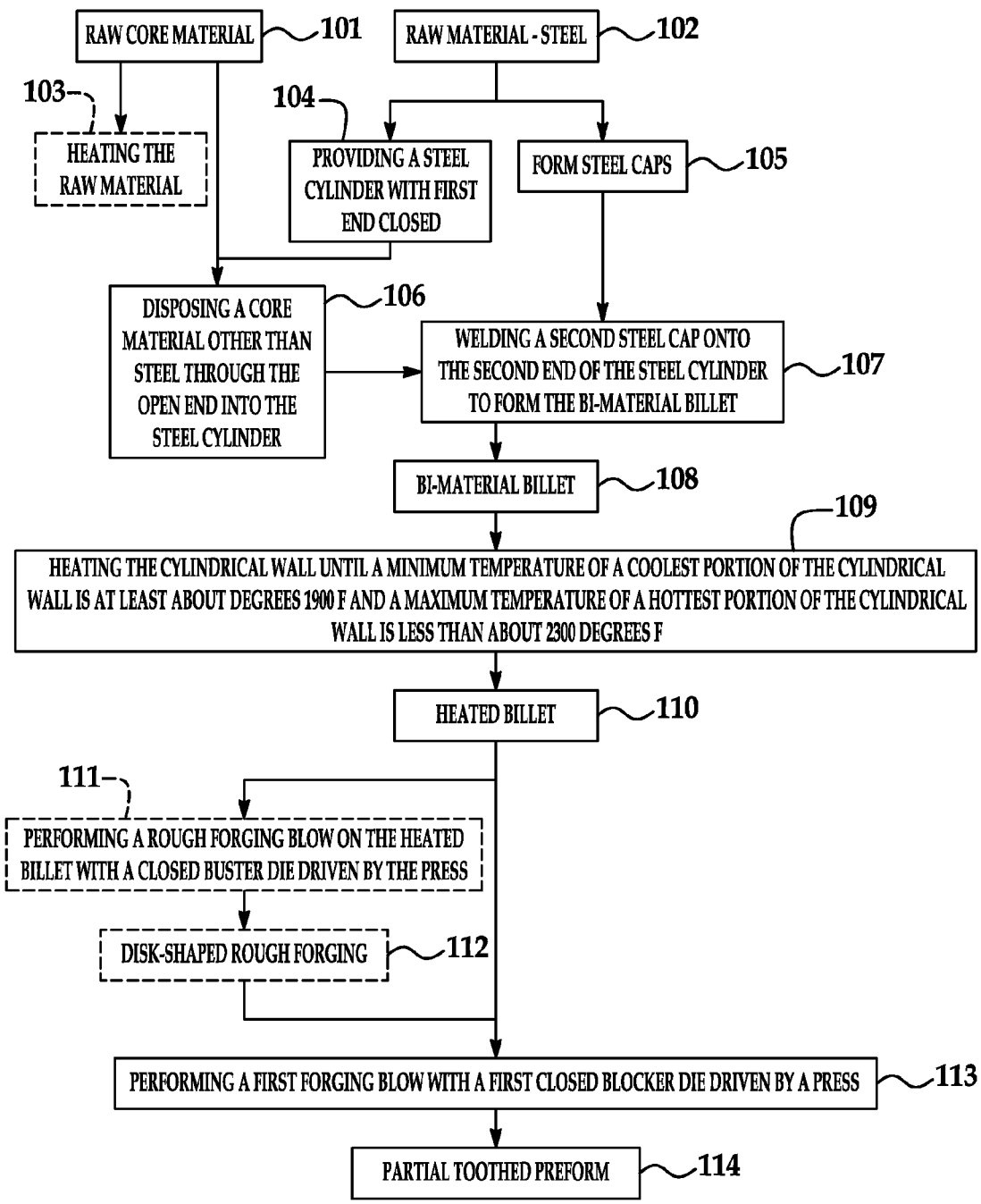
FIGS. 16A and 16B is a flowchart depicting an example of the method of the present disclosure.
Figure 16B:
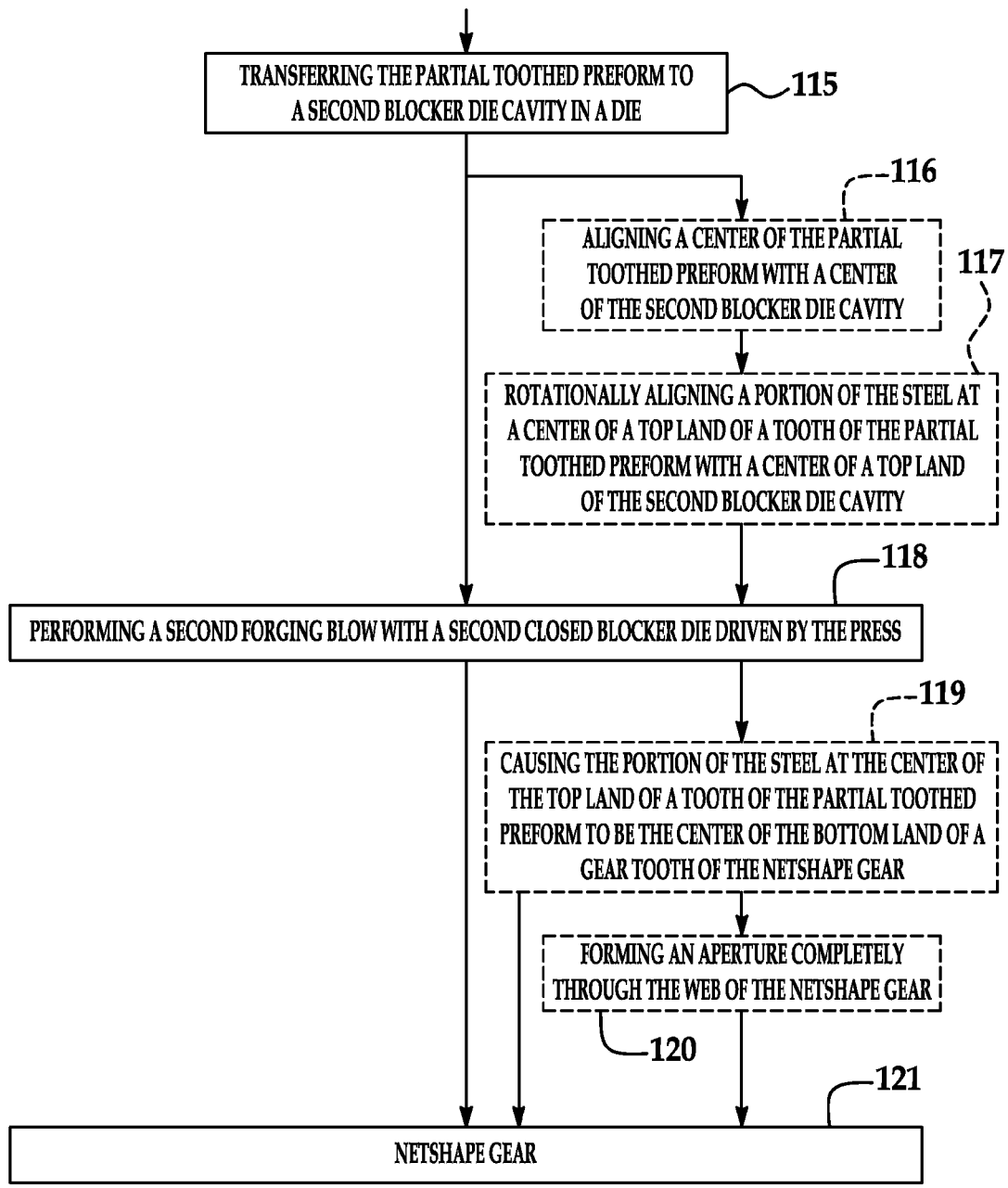

Examples of the present disclosure may include through-hardening the steel shell 13 of the bi-material forged gear in examples having a glass powder for the core material 30. After forging, the hot steel shell 13 may be quenched (in water or oil) to get a martensitic transformation of the steel in the steel shell 13 without causing a thermal fracture of the steel shell 13 due to the compressibility of the powder glass core material 30 inside the rapidly shrinking steel shell 13. In some examples of the present disclosure having a non-porous core material 30, or an incompressible core material 30, the steel shell 13 may crack if quenching is attempted. Due to its low thermal conductivity, a glass core material 30 may be much hotter than the steel shell 13 when the steel shell 13 is quenched. Therefore, the steel shell 13 may be shrinking at a much faster rate than the glass core material 30. In examples having a low CTE glass core material 30, (e.g. borofloat glass) there may be enough gap between the steel shell 13 and the glass core material 30 at forging temperatures to enable the shrinkage of the steel shell 13 without fracturing the steel shell 13 upon quenching—even if the example includes a solid glass core 30 instead of powder. Furthermore, the through-hardened steel shell 13 may be tempered by latent heat of the glass core material 30, resulting in a tempered martensitic steel shell 13 without a costly in-furnace tempering operation FIGS. 16A and 16B together are a flowchart depicting an example of the method of the present disclosure. The flowchart begins with the raw core material at 101 and the raw steel material at 102. The raw steel material is used to provide a steel cylinder with first end closed at 104. The raw steel material is also used to form steel caps at 105. The steel cylinder may be, for example a drawn cylinder, a rolled cylinder with a welded seam, or a deep drawn cylinder. In examples with a drawn cylinder or a rolled cylinder with a welded seam, the first end may be closed by welding a steel cap onto the first end. In examples in which the cylinder is deep drawn, the first end is formed with an integral cap. Disposing a core material other than steel through the open end into the steel cylinder is depicted at 106. In some examples, the raw core material may be heated 103 prior to disposing into the steel. Welding a second steel cap onto the second end of the steel cylinder to form the bi-material billet is depicted at 107. The bi-material billet is shown at 108. 109 depicts heating the cylindrical wall until a minimum temperature of a coolest portion of the cylindrical wall is at least about 1900 degrees F. and a maximum temperature of a hottest portion of the cylindrical wall is less than about 2300 degrees F. It is to be understood that in some examples, the heated core material from 103 provides the heat to the cylindrical wall. In other examples, the wall may be heated by induction heating. In still other examples, the bi-material billet may be heated in a furnace. The heated billet is depicted at 110. In examples, the method includes performing a rough forging blow on the heated billet with a closed buster die driven by the press at 111. The rough forging blow produces a disk-shaped rough forging shown at 112. Performing a first forging blow with a first closed blocker die driven by a press is depicted at 113. It is to be understood that 113 may be performed on the heated billet from 110, or the disk-shaped rough forging from 112. The first forging blow 113 results in a partial toothed preform at 114. Transferring the partial toothed preform to a second blocker die cavity in a die is depicted at 115. Performing a second forging blow with a second closed blocker die driven by the press is depicted at 118. In some examples, the method may include aligning a center of the partial toothed preform with a center of the second blocker die cavity at 116 prior to performing the second forging blow at 118. In methods that include 116, 117 is also included, rotationally aligning a portion of the steel at a center of a top land of a tooth of the partial toothed preform with a center of a top land of the second blocker die cavity. The second forging blow at 118 results in the netshape gear 121. In examples that include 116-117, the second forging blow 118 causes the portion of the steel at the center of the top land of the tooth of the partial toothed preform to be the center of the bottom land of a gear tooth of the netshape gear at 119. In some of the examples including 118, forming an aperture completely through the web of the netshape gear is also included as depicted at 120. It is to be understood that examples of the method may include other elements that are included in the present disclosure and not depicted in FIG. 16A or FIG. 16B.

It is to be understood that the terms "connect/connected/ connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Further, it is to be understood that the ranges provided herein include the stated range and any value or sub-range within the stated range. For example, a depth ranging from about 0.005 inch to about 0.025 inch should be interpreted to include not only the explicitly recited limits of 0.005 inch to 0.025 inch, but also to include individual amounts, such as 0.007 inch, 0.010 inch, etc., and sub-ranges, such as from about 0.009 inch to about 0.015 inch, etc. Furthermore, when "about" is utilized to describe a value, this is meant to encompass minor variations (±10% from the stated value (e.g., about 0.025 inch is 0.023 inch to 0.027 inch)).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A method for manufacturing a gear, comprising:
    forming a bi-material billet by:
        providing a steel cylinder having:
            a cylindrical wall with a cylindrical wall thickness;
            a first end closed with a first steel cap; and
            a second end distal to the first end wherein the second end is an open end;
        disposing a core material other than steel through the open end into the steel cylinder;
        welding a second steel cap onto the second end of the steel cylinder to form the bi-material billet;
    heating the formed bi-material billet by heating the cylindrical wall until a minimum temperature of a coolest portion of the cylindrical wall is at least about 1900 degrees F. and a maximum temperature of a hottest portion of the cylindrical wall is less than about 2300 degrees F.;
    performing a first forging blow on the heated billet or on a disk-shaped rough forging forged from the heated billet with a first closed blocker die driven by a press to produce a partial toothed preform; and
    performing a second forging blow on the partial toothed preform with a second closed blocker die driven by the press to produce a netshape gear wherein:
        the first closed blocker die has a die cavity including gear tooth forms;
        the partial toothed preform includes a plurality of spaced gear teeth; and
        at least 85 percent of a volume of the core material is in a liquid phase or a viscous glass phase during the steps of:
            performing the first forging blow; and
            performing the second forging blow.

2. The method as defined in claim 1, further comprising performing a rough forging blow on the heated billet with a closed buster die driven by the press to produce the disk-shaped rough forging after the heating and prior to the performing the first forging blow.

3. The method as defined in claim 2 wherein the buster die, the first blocker die, and the second blocker die comprise a multi-stage die set for simultaneous operation on a single press.

4. The method as defined in claim 2 wherein the rough forging blow, the first forging blow and the second forging blow are performed on a single heat of the bi-material billet.

5. The method as defined in claim 1 wherein:
    the core material is composed of aluminum or an aluminum alloy.

6. The method as defined in claim 5 wherein the heating is performed via a high frequency induction heater operating on the cylindrical wall at an operating frequency from 9000 Hertz to 11000 Hertz and wherein the high frequency induction heater applies from 5000 Kilowatts to 7000 Kilowatts per square meter of an external surface of the steel cylinder.

7. The method as defined in claim 5, further comprising induction hardening a gear tooth surface of the gear to a case depth of less than 1 millimeter.

8. The method as defined in claim 1, further comprising:
    during the first forging blow, operating the first blocker die to squeeze the core material from between a first central portion of a steel shell and a second central portion of the steel shell opposite the first central portion to collapse the first central portion and the second central portion into mutual contact thereby producing a steel web at a center of the partial toothed preform or the netshape gear.

9. The method as defined in claim 8, further comprising:
    transferring the partial toothed preform to a second blocker die cavity in a die;
    aligning a center of the partial toothed preform with a center of the second blocker die cavity;
    rotationally aligning a portion of the steel at a center of a top land of a tooth of the partial toothed preform with a center of a top land of the second blocker die cavity; and
    performing the second forging blow on the partial toothed preform in the second blocker die cavity, thereby:
    causing the portion of the steel at the center of the top land of the tooth of the partial toothed preform to be a center of a bottom land of a gear tooth of the netshape gear; and
    forming an aperture completely through the web of the netshape gear.

10. The method as defined in claim 8, further comprising:
    transferring the partial toothed preform to a second blocker die cavity in a die;

aligning a center of the partial toothed preform with a center of the second blocker die cavity;

rotationally aligning a portion of the steel at a center of a top land of a tooth of the partial toothed preform with a center of a top land of the second blocker die cavity; and performing the second forging blow on the partial toothed preform in the second blocker die cavity thereby causing the portion of the steel at the center of the top land of the tooth of the partial toothed preform to be the center of the bottom land of a gear tooth of the netshape gear.

11. The method as defined in claim 1 wherein the second cap is welded onto the second end of the steel cylinder by electron beam welding or by friction welding.

12. The method as defined in claim 11 wherein the second steel cap includes:

a steel disk having a substantially flat base surface and center axis orthogonal to the base surface;

an annular wall projecting from the steel disk opposite to the base surface;

an open cavity defined by the annular wall and the steel disk, the open cavity having a mouth opposite the steel disk defined by the annular wall, the open cavity having a depth measured from a plane defined by an edge of a shortest side of the annular wall to the steel disk, the depth ranging from about 0.005 inch to about 0.015 inch; and an end surface defined on the annular wall distal to the steel disk;

wherein the end surface is substantially flat and perpendicular to the center axis, or the end surface is an annular bevel.

13. The method as defined in claim 1 wherein a minimum thickness of steel on the gear teeth is at least 50 percent of a maximum thickness of steel on the gear teeth.

14. The method as defined in claim 13 wherein the minimum thickness of steel on the gear teeth is at least 2 millimeters.

15. The method as defined in claim 1 wherein the first forging blow and the second forging blow are performed on a single heat of the bi-material billet.

16. The method as defined in claim 1 wherein a ratio of a coefficient of thermal expansion of the core material to a coefficient of thermal expansion of the steel is from about 0.8 to about 1.2.

* * * * *